US012748222B2

(12) United States Patent
Ishinari et al.

(10) Patent No.: US 12,748,222 B2
(45) Date of Patent: Sep. 29, 2026

(54) RADIATION IMAGING APPARATUS, RADIATION IMAGING SYSTEM, RADIATION IMAGING METHOD, AND STORAGE MEDIUM

(71) Applicant: CANON KABUSHIKI KAISHA, Tokyo (JP)

(72) Inventors: Yutaka Ishinari, Kanagawa (JP); Junya Odori, Kanagawa (JP); Toshitaka Noro, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 18/923,250

(22) Filed: Oct. 22, 2024

(65) Prior Publication Data

US 2025/0044464 A1 Feb. 6, 2025

Related U.S. Application Data

(63) Continuation of application No. PCT/JP2023/014614, filed on Apr. 10, 2023.

(30) Foreign Application Priority Data

Apr. 25, 2022 (JP) ................................ 2022-071585
Feb. 17, 2023 (JP) ................................ 2023-023496

(51) Int. Cl.

| | |
|---|---|
| ***G01T 1/175*** | (2006.01) |
| ***H04N 23/65*** | (2023.01) |
| ***H04N 23/661*** | (2023.01) |
| *G01T 7/00* | (2006.01) |

(52) U.S. Cl.

CPC ........... *G01T 1/175* (2013.01); *H04N 23/651* (2023.01); *H04N 23/661* (2023.01); *G01T 7/005* (2013.01)

(58) Field of Classification Search

CPC ....... G01T 1/175; G01T 7/005; H04N 23/651; H04N 23/661; A61B 6/00

See application file for complete search history.

(56) References Cited

FOREIGN PATENT DOCUMENTS

| | | | | |
|---|---|---|---|---|
| JP | 2006208308 A | * | 8/2006 | ........... H04N 23/651 |
| JP | 2017092966 A | | 5/2017 | |
| JP | 2017192504 A | | 10/2017 | |

* cited by examiner

*Primary Examiner* — Kiho Kim
(74) *Attorney, Agent, or Firm* — Canon U.S.A., Inc. IP Division

(57) ABSTRACT

A radiation imaging apparatus that performs radiation imaging by detecting radiation emitted from a radiation source, wherein, in a case where the radiation imaging apparatus is in a standby state in which the radiation imaging apparatus awaits an activation signal transmitted from a control apparatus that controls the radiation imaging apparatus, the radiation imaging apparatus transmits internal information about the radiation imaging apparatus to the control apparatus.

15 Claims, 3 Drawing Sheets

RADIATION IMAGING APPARATUS, RADIATION IMAGING SYSTEM, RADIATION IMAGING METHOD, AND STORAGE MEDIUM

CROSS-REFERENCE TO RELATED APPLICATIONS

This application is a Continuation of International Patent Application No. PCT/JP2023/014614, filed Apr. 10, 2023, which claims the benefit of Japanese Patent Applications No. 2022-071585, filed Apr. 25, 2022, and No. 2023-023496, filed Feb. 17, 2023, all of which are hereby incorporated by reference herein in their entirety.

BACKGROUND OF THE INVENTION

Field of the Invention

The present disclosure relates to a radiation imaging apparatus, a radiation imaging system, a radiation imaging method, and a storage medium.

Background Art

In recent years, a radiation imaging apparatus using a flat detector has widely been put into practical use as an imaging apparatus used for medical imaging diagnosis and non-destructive inspection based on radiography. In the flat detector, solid-state imaging elements made of amorphous silicon or single crystal silicon are two-dimensionally arranged.

Such a radiation imaging apparatus can acquire an image by accumulating signal charges generated in each pixel in accordance with a detected amount of radiation, reading the charges, and performing analog-to-digital (AD) conversion. For example, in the medical imaging diagnosis, the radiation imaging apparatus is used as a digital imaging apparatus for still image capturing, such as plain radiographing, or moving image capturing, such as fluoroscopic imaging.

Further, wireless radiation imaging apparatuses have been developed so that handling of the apparatuses have become easier. Because these radiation imaging apparatuses each operate with a battery, power saving is desired. Thus, when such a radiation imaging apparatus is waiting for an activation command or an imaging protocol, the radiation imaging apparatus needs to be operated in a power-saving state by operating as few internal circuits as possible.

Even when the radiation imaging apparatus is operated in the power-saving state, its internal state, such as a remaining battery level, could change. Thus, there is a possibility that, when an operator cancels the power-saving state of the radiation imaging apparatus, the radiation imaging apparatus may not be in an imageable state. Therefore, it is desirable that the operator be notified of the internal state of the radiation imaging apparatus as needed.

Japanese Patent Application Laid-Open No. 2017-192504 discusses a method for displaying error information, a remaining battery level, and the like of a radiation imaging apparatus by using a light-emitting diode (LED) provided in the radiation imaging apparatus.

CITATION LIST

Patent Literature

PTL 1: Japanese Patent Application Laid-Open No. 2017-192504

SUMMARY OF THE INVENTION

According to an aspect of the present invention, a radiation imaging apparatus that performs radiation imaging by detecting radiation emitted from a radiation source, wherein, in a case where the radiation imaging apparatus is in a standby state in which the radiation imaging apparatus awaits an activation signal transmitted from a control apparatus that is placed outside the radiation imaging apparatus and that controls the radiation imaging apparatus, the radiation imaging apparatus transmits internal information about the radiation imaging apparatus to the control apparatus, wherein, upon receiving the internal information about the radiation imaging apparatus, the control apparatus causes a display device to display the internal information about the radiation imaging apparatus, and wherein a wireless communication method used to transmit the internal information about the radiation imaging apparatus to the control apparatus is a shorter-range wireless communication method than a wireless communication method used to transmit image data captured by the radiation imaging of the radiation imaging apparatus.

Further features of the present invention will become apparent from the following description of exemplary embodiments with reference to the attached drawings.

DESCRIPTION OF THE EMBODIMENTS

There are cases in which a radiation imaging apparatus is installed on an operating table or in a rack, and therefore, depending on the installation orientation of the radiation imaging apparatus, an operator may not be able to check information indicating an internal state of the radiation imaging apparatus. In addition, because the operator needs to directly observe the radiation imaging apparatus, there is a possibility that the operation of checking the information indicating the internal state of the radiation imaging apparatus may degrade usability during imaging.

The present disclosure is directed to easily checking internal information about a radiation imaging apparatus while the radiation imaging apparatus is operating in a power-saving state.

In addition to the above, the present disclosure is also directed to providing effects that are derived from various configurations indicated in the following exemplary embodiments of the invention and that cannot be obtained by the conventional techniques.

At least one exemplary embodiment of the present disclosure is directed to a radiation imaging apparatus that performs radiation imaging by detecting radiation emitted from a radiation source, wherein, in a case where the radiation imaging apparatus is in a standby state in which the radiation imaging apparatus awaits an activation signal transmitted from a control apparatus that controls the radiation imaging apparatus, the radiation imaging apparatus is configured to transmit internal information about the radiation imaging apparatus to the control apparatus.

According to at least one exemplary embodiment of the present disclosure, in a case where the radiation imaging apparatus is operating in a power-saving state, the internal information about the radiation imaging apparatus can easily be checked.

First Exemplary Embodiment

Figure 1:
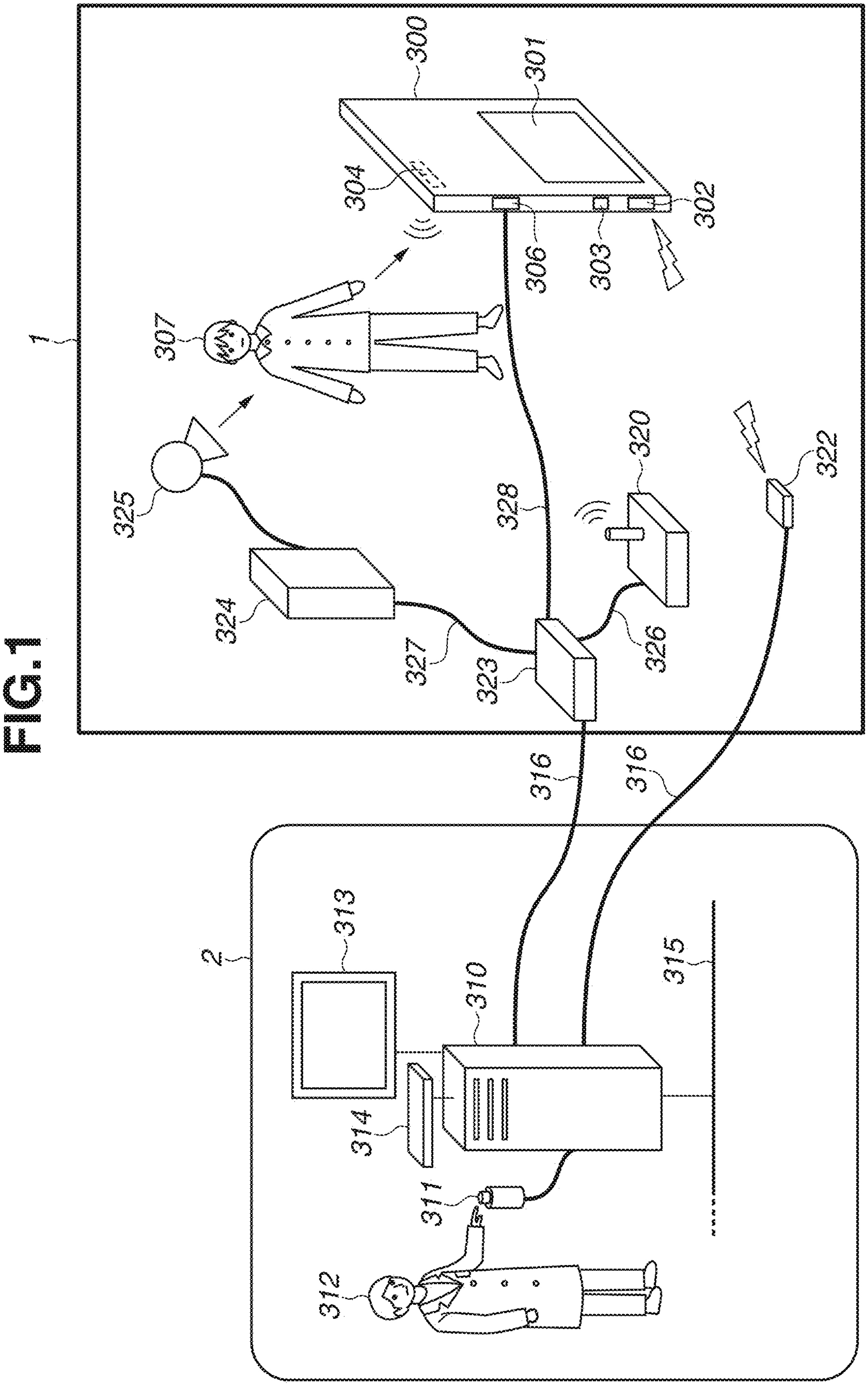
FIG. 1 is a diagram schematically illustrating a radiation imaging system according to a first exemplary embodiment.

Hereinafter, a radiation imaging system according to each exemplary embodiment will be described with reference to the drawings. FIG. 1 illustrates a radiation imaging system 10 according to a first exemplary embodiment.

As illustrated in FIG. 1, the radiation imaging system 10 is provided in a radiation room 1 in which radiation imaging based on radiation irradiation is performed, and in a control room 2 located near the radiation room 1.

The radiation room 1 includes, as the radiation imaging system 10, a radiation imaging apparatus 300, an access point 320, a communication control device 323, a radiation generation device 324, and a radiation source 325. The radiation room 1 further includes an entry device 322, an access point (AP) communication cable 326, a radiation-generation-device communication cable 327, and a sensor communication cable 328.

The control room 2 includes, as the radiation imaging system 10, a control apparatus 310, a radiation irradiation switch 311, a display device 313, an input device 314, an in-hospital local area network (LAN) 315, and radiation-room communication cables 316.

The radiation imaging apparatus 300 includes a power supply control unit 301 including a battery and the like, a short-range wireless communication unit 302, a registration switch 303, a wireless communication unit 304, and a wired communication unit 306. The radiation imaging apparatus 300 detects radiation that has been transmitted through a subject 307, and generates radiation image data.

The access point 320 is an access point for performing wireless communication, and is used for communication between the radiation imaging apparatus 300 and the control apparatus 310 via the communication control device 323. The radiation imaging apparatus 300 and the communication control device 323 can also communicate by wired communication using the sensor communication cable 328. In the present exemplary embodiment, as an example, the access point 320 performs communication by using the 2.4 GHz band, the 5 GHz band, or the 60 GHz band of a wireless LAN.

The radiation generation device 324 controls the radiation source 325 such that the radiation source 325 emits radiation toward the subject 307. The radiation generation device 324 includes a radiation source control unit that controls the radiation source 325 such that the radiation source 325 emits radiation based on a predetermined condition, and includes a generation control unit that controls generation of radiation in accordance with an irradiation start or stop signal from the radiation imaging apparatus 300. The radiation source control unit and the generation control unit may each be provided as a separate device.

The AP communication cable 326 is a cable for connecting the access point 320 and the communication control device 323. The radiation-generation-device communication cable 327 is a cable for connecting the radiation generation device 324 and the communication control device 323.

The control apparatus 310 communicates with the radiation generation device 324 and the radiation imaging apparatus 300 via the communication control device 323 and the access point 320 or the sensor communication cable 328, and comprehensively controls the radiation imaging system 10.

Via the radiation irradiation switch 311, a radiation irradiation timing is input by an operation of an operator 312. The input device 314 is a device for receiving an instruction from the operator 312, and various kinds of input devices, such as a keyboard and a touch panel, are used. The display device 313 is a device for displaying radiation image data on which image processing has been performed and a graphical user interface (GUI), and a display or the like is used as the display device 313. The in-hospital LAN 315 is a main network in the hospital. The radiation-room communication cables 316 are cables for connecting the control apparatus 310 to the communication control device 323 and the entry device 322 in the radiation room 1.

Next, an operation of the radiation imaging system 10 will be described.

First, the operator 312 registers the radiation imaging apparatus 300 with the radiation imaging system. When the operator 312 presses the registration switch 303 of the radiation imaging apparatus 300, a short-range wireless communication is started between the short-range wireless communication unit 302 of the radiation imaging apparatus 300 and the entry device 322.

The control apparatus 310 transmits wireless-connection-related information about the access point 320 to the radiation imaging apparatus 300 via the short-range wireless communication of the entry device 322. When the wireless LAN is used, the wireless-connection-related information includes, for example, a communication method, a physical channel, a service set identifier (SSID), and an encryption key of IEEE 802.11.

The radiation imaging apparatus 300 sets the wireless communication unit 304 in accordance with the received wireless-connection-related information. Based on the setting, the radiation imaging apparatus 300 establishes a wireless communication connection between the access point 320 and the wireless communication unit 304.

The wireless-connection-related information may be transmitted to the radiation imaging apparatus 300 via the sensor communication cable 328 and the wired communication unit 306.

Next, the operator 312 enters subject information, such as identification (ID), name, and date of birth of the subject 307 and an imaging region of the subject 307 to the control apparatus 310. After entering the imaging region, the operator 312 fixes the posture of the subject 307 and the radiation imaging apparatus 300.

When preparation for the imaging is completed, the operator 312 presses the radiation irradiation switch 311. When the radiation irradiation switch 311 is pressed, the radiation source 325 emits radiation to the subject 307.

The radiation imaging apparatus 300 wirelessly communicates with the radiation generation device 324 and controls a start and an end of the radiation irradiation. The radiation emitted toward the subject 307 passes through the subject 307 and enters the radiation imaging apparatus 300. The radiation imaging apparatus 300 converts the incident radiation into visible light and detects the visible light with photoelectric conversion elements as a radiation image signal.

The radiation imaging apparatus 300 drives the photoelectric conversion elements to read the radiation image signal, and converts an analog signal into a digital signal with an analog-to-digital (AD) conversion circuit to obtain digital radiation image data. The obtained digital radiation image data is transferred from the radiation imaging apparatus 300 to the control apparatus 310 by a wireless communication.

The control apparatus 310 performs image processing on the received digital radiation image data. The control apparatus 310 displays, on the display device 313, a radiation image based on the radiation image data on which the image processing has been performed. The control apparatus 310 functions as an image processing apparatus and a display control apparatus.

Figure 2:
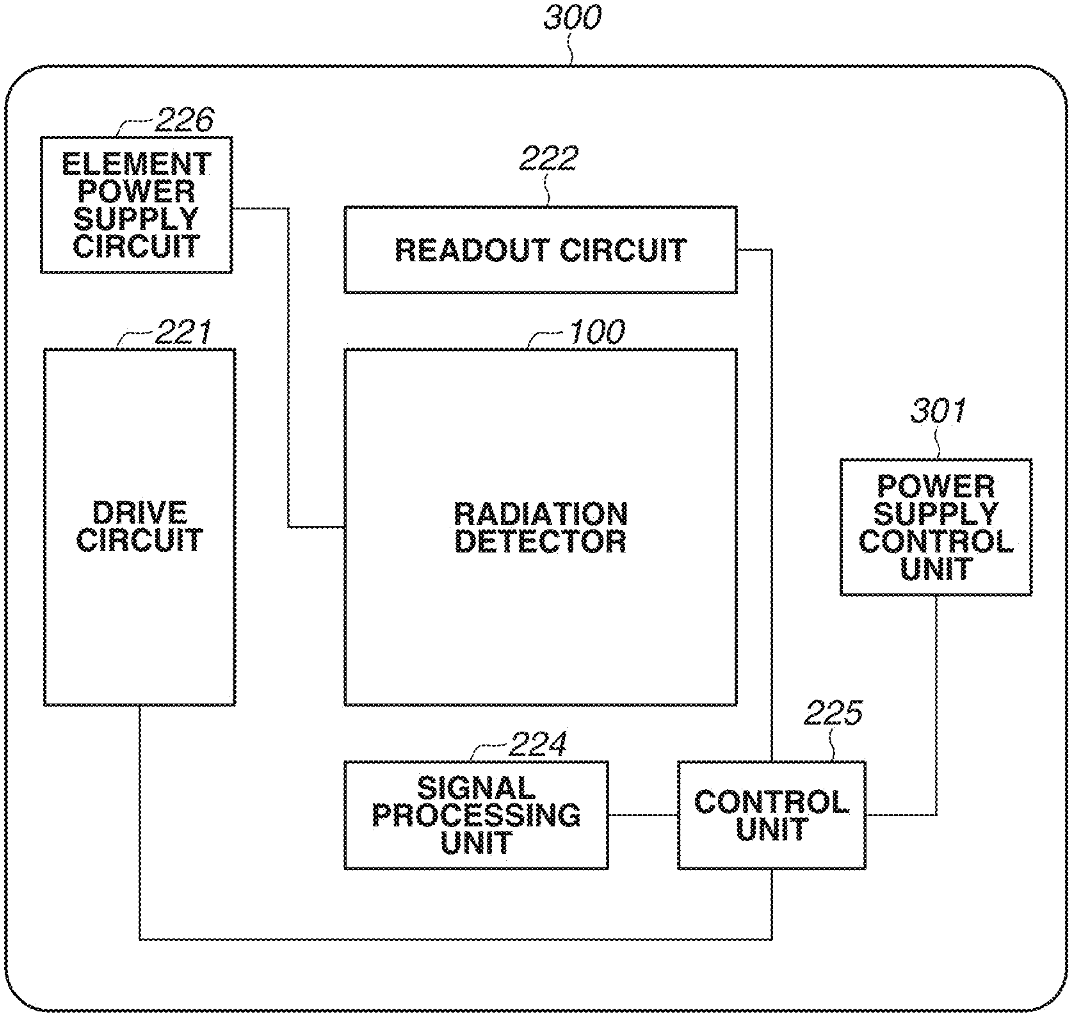
FIG. 2 is a functional block diagram illustrating a radiation imaging apparatus according to the first exemplary embodiment.

FIG. 2 is a functional block diagram illustrating the radiation imaging apparatus 300.

As illustrated in FIG. 2, the radiation imaging apparatus 300 includes a radiation detector 100. The radiation detector 100 has a function of detecting emitted radiation. The radiation detector 100 includes a plurality of pixels arranged so as to form a plurality of rows and a plurality of columns. In the following description, a region in which the plurality of pixels is arranged in the radiation detector 100 is referred to as an imaging region.

The radiation detector 100 includes a plurality of signal lines and a plurality of drive lines. Each signal line corresponds to one of the plurality of columns in the imaging region. Each drive line corresponds to one of the plurality of rows in the imaging region.

Each signal line is connected to a readout circuit 222. Herein, the readout circuit 222 includes a plurality of integrating amplifiers, a multiplexer, and an AD converter. Each drive line is driven by a drive circuit 221.

The radiation detector 100 includes a bias line, which is connected to each pixel. The bias line receives a bias voltage Vs from an element power supply circuit 226. The bias voltage Vs is supplied from the element power supply circuit 226.

The power supply control unit 301 includes a battery, a direct-current-to-direct-current (DC-DC) converter, and the like. The power supply control unit 301 includes the element power supply circuit 226, and generates an analog circuit power supply and a digital circuit power supply that performs drive control, wireless communication, and the like.

A control unit 225 controls the drive circuit 221, the readout circuit 222, and the like based on information from a signal processing unit 224 and control commands from the control apparatus 310.

Next, an operation of transmitting the internal state of the radiation imaging apparatus 300 to the control apparatus 310 will be described.

In a state in which the radiation imaging apparatus 300 is not performing an imaging operation, the radiation imaging apparatus 300 transmits its internal information to the control apparatus 310 via the wired communication unit 306. The radiation imaging apparatus 300 may start to transmit the internal information when the imaging operation of the radiation imaging apparatus 300 is completed or when the internal information changes after the last imaging operation is completed. The radiation imaging apparatus 300 may start to transmit the internal information when the operator 312 executes a specific operation.

The control apparatus 310 displays the internal information transmitted from the radiation imaging apparatus 300 on the display device 313.

Examples of the internal information include individual identification information, the number of images not transferred yet, the number of images savable, a remaining battery level, communication environment information, error information, an internal temperature, angular information, and positional information. The error information is information indicating that there is an abnormality in any one of various kinds of internal information. For example, the error information may be information indicating that the radiation imaging apparatus 300 has detected an impact applied thereto due to a fall or the like of the radiation imaging apparatus 300. To detect the impact, a known sensor, such as an acceleration sensor, may be mounted in the radiation imaging apparatus 300, and whether an acceleration equal to or greater than a predetermined value is applied to the radiation imaging apparatus 300 may be detected. The impact may be detected by using different known means.

The error information may be information indicating that the radiation imaging apparatus 300 has detected that its internal temperature has exceeded a predetermined value. To detect the temperature, a known sensor, such as a temperature sensor, may be mounted in the radiation imaging apparatus 300, and whether the temperature of a predetermined value or greater has been generated in the radiation imaging apparatus 300 may be detected. The temperature in the radiation imaging apparatus 300 may be detected by using different known means.

The error information may be information indicating that the remaining battery level of the radiation imaging apparatus 300 is less than a predetermined remaining battery level.

The error information may be information indicating that the number of images that can be captured, the number being derived from the remaining capacity of the memory included in the radiation imaging apparatus 300, is less than a predetermined number.

The error information may be information indicating a state in which there is a problem with a wireless communication environment for performing imaging. An example of the state in which there is a problem with the wireless communication environment is a case where a received signal strength indicator (RSSI) value in at least one of the wireless communication unit 304 and the short-range wireless communication unit 302 is less than a predetermined value.

The error information may be information indicating detection of generation of a current and a voltage exceeding predetermined values in any one of various kinds of circuits included in the radiation imaging apparatus 300. Known sensors, such as a current sensor and a voltage sensor, may be used to detect the current and the voltage. Alternatively, different known means may be used.

The error information may be information indicating detection of application of static electricity to the radiation imaging apparatus 300, the applied static electricity being equal to or greater than a predetermined value. A known sensor, such as a surface potential sensor, may be used to detect the static electricity. Alternatively, different known means may be used.

The error information may be information indicating detection of application of magnetism to the radiation imaging apparatus 300, the applied magnetism being equal to or greater than a predetermined value. A known sensor, such as a magnetic sensor, may be used to detect the magnetism. Alternatively, different known means may be used.

The error information may be information indicating detection of an entry of light from the outside of a housing to the inside of the radiation imaging apparatus 300, for example, due to breakage of the housing of the radiation imaging apparatus 300. A known sensor, such as a phototransistor, may be used to detect an entry of light. Alternatively, different known means may be used.

The error information may be information indicating detection of an entry of moisture to the inside of the radiation imaging apparatus 300, for example, due to breakage of the housing of the radiation imaging apparatus 300. A known sensor, such as a leakage sensor, may be used to detect the entry of moisture. Alternatively, different known means may be used.

The error information may be information indicating an abnormality in an image acquired by the radiation imaging apparatus 300 in a state where radiation is not being emitted. For example, the abnormality may indicate a variation in a mean value of pixel values or may indicate deviation in histogram or in-plane distribution from a predetermined range. Further, the abnormality may be related to information about a defective pixel, the bias voltage Vs during a predetermined period, or a value used by an automatic exposure control function to detect an amount of radiation irradiation.

The error information may be information indicating that the control unit 225 has failed to access any one of various kinds of devices included in the radiation imaging apparatus 300. The error information may be information about an abnormality detected by capturing an image of the appearance of the radiation imaging apparatus 300 by using a camera or the like and analyzing the captured image.

The internal information may be transmitted to the control apparatus 310 via the wireless communication unit 304 or the short-range wireless communication unit 302. IEEE 802.11 or Bluetooth® may be used as the communication method. Alternatively, a different communication method may be used.

When Bluetooth® is used as the communication method, the internal information may be transmitted by adding data to an advertisement signal.

Furthermore, the wireless communication unit 304 and the short-range wireless communication unit 302 may be provided as different functional areas on the same electric substrate.

The operator 312 may determine the use of the radiation imaging apparatus 300 or the method for using the radiation imaging apparatus 300 based on the internal information displayed on the display device 313. For example, when the radiation imaging apparatus 300 and the control apparatus 310 are connected via the wireless communication unit 304 and when the internal information displayed on the display device 313 indicates that the remaining battery level is low, the communication unit may be switched to the wired communication unit 306 to connect the radiation imaging apparatus 300 and the control apparatus 310 to each other.

In some cases, a plurality of radiation imaging apparatuses 300 is associated with the control apparatus 310. The operator 312 may compare the internal information about the plurality of radiation imaging apparatuses 300 displayed on the display device 313 and may select a radiation imaging apparatus 300 to use. For example, the radiation imaging apparatus 300 to be connected to the control apparatus 310 can be switched by clicking internal information displayed on the display device 313.

Furthermore, to allow the operator 312 to select an appropriate radiation imaging apparatus 300, the internal information displayed on the display device 313 may be updated regularly at predetermined time intervals, or may be updated when it is detected that the radiation imaging apparatus 300 has reached a predetermined state.

The predetermined state of the radiation imaging apparatus 300 in which the internal information is updated may be, for example, a case where any one of various kinds of error information as described above is detected in the internal information about the radiation imaging apparatus 300. When the error information is detected, the internal information including the error information is transmitted from the radiation imaging apparatus 300 to the control apparatus 310, and the control apparatus 310 causes the display device 313 to display the internal information. In this way, the operator 312 can check the state of the radiation imaging apparatus 300, such as the error information.

By notifying the operator 312 of the internal information about the radiation imaging apparatus 300 as described above via the display device 313, the operator 312 can easily check the radiation imaging apparatus 300 to be activated prior to activation.

Second Exemplary Embodiment

Next a second exemplary embodiment will be described.

In the first exemplary embodiment, there has been described an example in which the radiation imaging apparatus 300 transmits its internal information to the control apparatus 310 by using the short-range wireless communication unit 302, the wireless communication unit 304, or the wired communication unit 306, and the control apparatus 310 displays the internal information on the display device 313.

In a second exemplary embodiment, there will be describe a configuration in which a control apparatus 310 transmits an activation signal in a state where a radiation imaging apparatus 300 is in a power-saving state and the radiation imaging apparatus 300 consequently transitions to an imaging-ready state. In the following description, only the difference between the first exemplary embodiment and the second exemplary embodiment will be described.

Figure 3:
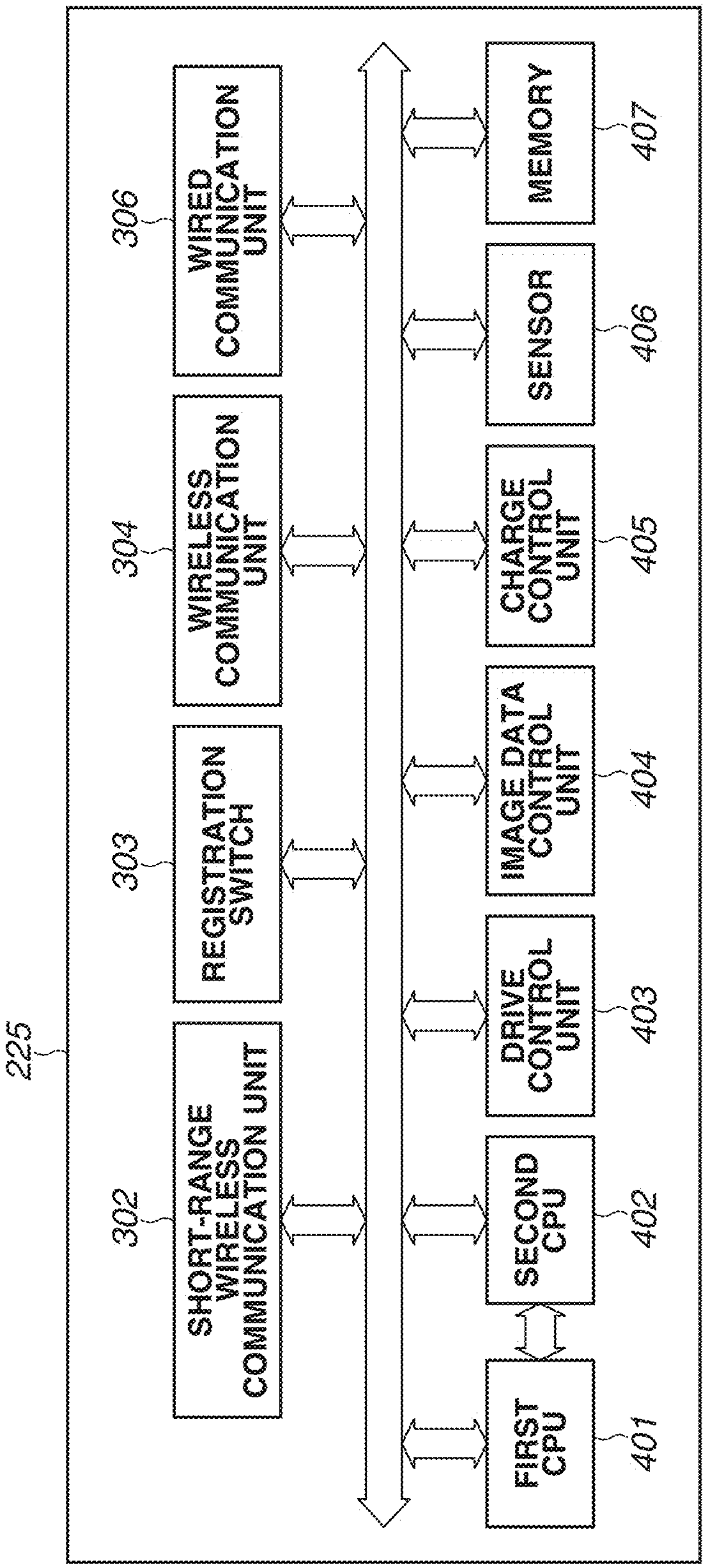
FIG. 3 is a functional block diagram illustrating a control unit in a radiation imaging apparatus according to a second exemplary embodiment.

FIG. 3 is a functional block diagram illustrating a control unit 225 of the radiation imaging apparatus 300. As illustrated in FIG. 3, the control unit 225 includes a short-range wireless communication unit 302, a registration switch 303, a wireless communication unit 304, and a wired communication unit 306. The control unit 225 further includes a first central processing unit (CPU) 401, a second CPU 402, a drive control unit 403, an image data control unit 404, a charge control unit 405, a sensor 406, and a memory 407. The sensor 406 may include a temperature sensor, an impact sensor, an angle sensor, and/or the like.

In the present exemplary embodiment, the first CPU 401 that controls the radiation imaging is turned off so as to set the radiation imaging apparatus 300 in the power-saving state. The first CPU 401 is activated by an activation signal from the control apparatus 310. The power-saving state in which the radiation imaging apparatus 300 awaits the activation signal is referred to as a standby state. The second CPU 402 transmits the internal information to the control apparatus 310 by controlling the short-range wireless communication unit 302, the wireless communication unit 304, or the wired communication unit 306.

The control apparatus 310 transmits the activation signal to the radiation imaging apparatus 300. When the second CPU 402 receives the activation signal via the short-range wireless communication unit 302, the wireless communication unit 304, or the wired communication unit 306, the second CPU 402 instructs a power supply control unit 301 to activate the first CPU 401. When the first CPU 401 is activated, the radiation imaging apparatus 300 transitions to an imaging-ready state.

The control apparatus 310 may automatically transmit the activation signal in response to reception of the internal information, or the operator 312 may make a decision to transmit the activation signal and may perform an operation to instruct the control apparatus 310 to transmit the activation signal via an input device 314.

When the control apparatus 310 automatically transmits the activation signal, a predetermined condition about the internal information may be set, and the control apparatus 310 may be configured not to transmit the control signal when the condition is not satisfied. Alternatively, transmission may be performed upon notifying the operator that the predetermined condition is not satisfied, or the transmission may be switched from automatic transmission to manual transmission. For example, the predetermined condition refers to a case where the internal information includes error information. Specifically, examples of the predetermined condition may include a case where the remaining battery level of the radiation imaging apparatus 300 is less than a predetermined remaining battery level, a case where the remaining memory level of the radiation imaging apparatus 300 is insufficient and the number of images that can be captured is less than a predetermined number, and a case where the wireless communication environment is problematic for image capturing.

When the operator 312 manually transmits the activation signal, the operator 312 may compare the internal information about the plurality of radiation imaging apparatuses 300 displayed on the display device 313 and may select a radiation imaging apparatus 300 to transmit the activation signal. For example, the operator 312 can determine a radiation imaging apparatus 300 to transmit the activation signal by clicking the internal information displayed on the display device 313.

The activation signal may be provided with individual identification information about the radiation imaging apparatus 300 to be activated. When the radiation imaging apparatus 300 receives the activation signal, the second CPU 402 compares the individual identification information in the activation signal with the individual identification information about the radiation imaging apparatus 300, and if these pieces of individual identification information do not match, the first CPU 401 does not need to be activated.

The internal information could have been updated by the time the radiation imaging apparatus 300 receives the activation signal. In accordance with the latest internal information held by the radiation imaging apparatus 300, a predetermined condition may be set so that the second CPU 402 may determine whether to activate the first CPU 401. For example, if the predetermined condition is not satisfied, the second CPU 402 does not need to activate the first CPU 401. Alternatively, the second CPU 402 may activate the first CPU 401 after notifying the operator 312 that the internal information does not satisfy the predetermined condition via the display device 313. Alternatively, after the operator 312 is notified that the internal information does not satisfy the predetermined condition via the display device 313, the operator 312 may decide whether to activate the first CPU 401 and may issue an instruction to the control apparatus 310 by using the input device 314.

For example, the predetermined condition refers to a case where the internal information includes error information. Specifically, examples of the predetermined condition may include a case where the remaining battery level of the radiation imaging apparatus 300 is less than a predetermined remaining battery level, and a case where the remaining memory level of the radiation imaging apparatus 300 is insufficient and the number of images that can be captured is less than a predetermined number. In addition, for example, in a case where a fall of the radiation imaging apparatus 300 is detected before the activation signal is received, or in a case where the wireless communication environment is problematic for image capturing, the second CPU 402 does not need to activate the first CPU 401.

Furthermore, the first CPU 401 and the second CPU 402 may be provided as different functional areas in the same CPU.

When the activation signal is transmitted and received by wireless communication, IEEE802.11 or Bluetooth® may be used as the communication method. Alternatively, a different communication method may be used.

When Bluetooth® is used as the communication method, a connection request may be used as the activation signal.

Third Exemplary Embodiment

Next, a third exemplary embodiment will be described.

In the second exemplary embodiment, there has been described an example in which, in a case where the radiation imaging apparatus 300 is in the standby state, the control apparatus 310 transmits an activation signal so that the radiation imaging apparatus 300 transitions to the imaging-ready state. In contrast, in a third exemplary embodiment, there will be describe a configuration in which a sequence for causing a radiation imaging apparatus 300 to transition to the imaging-ready state is optimized by including imaging protocol information in an activation signal transmitted by a control apparatus 310. In the following description, only the difference from the first exemplary embodiment and the second exemplary embodiment will be described.

In the present exemplary embodiment, the imaging protocol information is included in the activation signal transmitted by the control apparatus 310. Examples of the imaging protocol information include an imaging mode, an imaging technique, a tube voltage and a tube current of radiation emitted from a radiation source 325, and an irradiation time thereof.

The imaging mode is information related to a method for driving the radiation imaging apparatus 300, such as synchronous image capturing, asynchronous image capturing, still image capturing, moving image capturing, a frame rate, and binning.

In a case where there are a plurality of radiation generation apparatuses and a plurality of radiation sources, identification information about a radiation generation apparatus and a radiation source to use is also included in the imaging protocol information.

A first CPU 401 and a second CPU 402 determine the imaging protocol information included in the activation signal and determine the sequence for causing the radiation imaging apparatus 300 to transition to the imaging-ready state. For example, if the first CPU 401 and the second CPU 402 determine, from the activation signal, that the mode requires image data for offset correction, the radiation imaging apparatus 300 can transition to the imaging-ready state after acquiring the image data for offset correction. The present disclosure includes the following configurations and methods.

(Configuration 1)

A radiation imaging apparatus of a radiation imaging system including the radiation imaging apparatus that performs radiation imaging by detecting radiation emitted from a radiation source and a control apparatus that controls the radiation imaging apparatus, wherein, in a case where the radiation imaging apparatus is in a standby state in which the radiation imaging apparatus awaits an activation signal transmitted from the control apparatus, the radiation imaging apparatus transmits internal information about the radiation imaging apparatus to the control apparatus.

(Configuration 2)

A radiation imaging apparatus that performs radiation imaging by detecting radiation emitted from a radiation source, wherein, in a case where the radiation imaging apparatus is in a standby state in which the radiation imaging apparatus awaits an activation signal transmitted from a control apparatus that controls the radiation imaging apparatus, the radiation imaging apparatus is configured to transmit internal information about the radiation imaging apparatus to the control apparatus.

(Configuration 3)

The radiation imaging apparatus according to Configuration 1 or 2, wherein the internal information includes at least one of individual identification information, a number of images not transferred yet, a number of images savable, a remaining battery level, communication environment information, error information, an internal temperature, angular information, and positional information.

(Configuration 4)

The radiation imaging apparatus according to any one of Configurations 1 to 4, wherein the radiation imaging apparatus transmits the internal information to the control apparatus at predetermined time intervals.

(Configuration 5)

The radiation imaging apparatus according to any one of Configurations 1 to 4, wherein the radiation imaging apparatus transmits the internal information to the control apparatus in a case where the radiation imaging apparatus is in a predetermined state.

(Configuration 6)

The radiation imaging apparatus according to Configuration 5, wherein the predetermined state is a state in which acceleration equal to or greater than a predetermined value is applied to the radiation imaging apparatus.

(Configuration 7)

The radiation imaging apparatus according to Configuration 5, wherein the predetermined state is a state in which an internal temperature of the radiation imaging apparatus is equal to or greater than a predetermined value.

(Configuration 8)

The radiation imaging apparatus according to any one of Configurations 1 to 7, comprising:

a first control unit that controls the radiation imaging apparatus in the radiation imaging; and a second control unit that is different from the first control unit, wherein the standby state is a state in which the first control unit is not activated.

(Configuration 9)

The radiation imaging apparatus according to Configuration 8, wherein, in the standby state, the second control unit activates the first control unit in response to reception of the activation signal by the radiation imaging apparatus.

(Configuration 10)

The radiation imaging apparatus according to Configuration 9, wherein the second control unit determines, based on the internal information, whether to activate the first control unit in response to the reception of the activation signal.

(Configuration 11)

The radiation imaging apparatus according to any one of Configurations 1 to 10, wherein the activation signal includes imaging protocol information, and wherein the radiation imaging apparatus determines a sequence for transitioning the radiation imaging apparatus to a state in which the radiation imaging is possible based on the imaging protocol information.

(Configuration 12)

The radiation imaging apparatus according to Configuration 11, wherein the imaging protocol information indicates at least one of an imaging mode, an imaging technique, a tube voltage and a tube current of radiation emitted from a radiation source, and an irradiation time.

(Configuration 13)

The radiation imaging apparatus according to any one of Configurations 1 to 12, wherein the radiation imaging apparatus uses at least one of IEEE 802.11 and Bluetooth® for communication with the control apparatus.

(Configuration 14)

The radiation imaging apparatus according to any one of Configurations 1 to 13, wherein, for the communication with the control apparatus, the radiation imaging apparatus uses different wireless communication methods for transmitting the internal information from the radiation imaging apparatus to the control apparatus and for transmitting image data captured by the radiation imaging of the radiation imaging apparatus.

(Configuration 15)

A radiation imaging system, comprising:

the radiation imaging apparatus according to any one of Configurations 1 to 14; and the control apparatus.

(Method 1)

A control method for a radiation imaging apparatus that performs radiation imaging by detecting radiation emitted from a radiation source, the method comprising:

transmitting, in a case where the radiation imaging apparatus is in a standby state in which the radiation imaging apparatus awaits an activation signal transmitted from a control apparatus that controls the radiation imaging apparatus, internal information about the radiation imaging apparatus to the control apparatus.

(Program)

A program for causing a computer to execute the control method according to Method 1.

Other Exemplary Embodiments

The present disclosure can also be realized by processing in which a program for implementing the above-described functions is supplied to a system or an apparatus via a network or a storage medium and at least one processor in a computer of the system or the apparatus reads and executes the program.

As a recording medium, any one of various kinds of recording media, such as a flexible disk, an optical disc (for example, a compact-disc read-only memory (CD-ROM) or a digital-versatile-disc read-only memory (DVD-ROM)), a magneto-optical disk, a magnetic tape, a nonvolatile memory (for example, a universal serial bus (USB) memory), and a ROM, can be used. Further, the program for implementing the above-described functions may be downloaded via a network and executed by a computer.

The functions of the above-described exemplary embodiments may be implemented not only by executing a program code read by the computer. The functions of the above-described exemplary embodiments may be implemented by the operating system (OS) or the like running on the computer performing part or all of actual processing based on instructions of the program code.

Furthermore, the program code read from the recording medium may be written into a memory provided in a function expansion board inserted into the computer or a function expansion unit connected to the computer. The above-described functions may be implemented by processing in which a CPU or the like provided in the function expansion board or the function expansion unit performs part or all of the actual processing based on instructions of the program code.

The present disclosure is not limited to the above-described exemplary embodiments, and variations and modifications may be made without departing from the spirit and scope of the present invention. Thus, the following claims are appended to publicize the scope of the invention.

According to at least one exemplary embodiment of the present disclosure, when the radiation imaging apparatus is operating in the power-saving state, the internal information about the radiation imaging apparatus can be easily checked.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A radiation imaging apparatus that performs radiation imaging by detecting radiation emitted from a radiation source, wherein, in a case where the radiation imaging apparatus is in a standby state in which the radiation imaging apparatus awaits an activation signal transmitted from a control apparatus that is placed outside the radiation imaging apparatus and that controls the radiation imaging apparatus, the radiation imaging apparatus transmits internal information about the radiation imaging apparatus to the control apparatus, wherein, upon receiving the internal information about the radiation imaging apparatus, the control apparatus causes a display device to display the internal information about the radiation imaging apparatus, and wherein a wireless communication method used to transmit the internal information about the radiation imaging apparatus to the control apparatus is a shorter-range wireless communication method than a wireless communication method used to transmit image data captured by the radiation imaging of the radiation imaging apparatus.

2. The radiation imaging apparatus according to claim 1, wherein the internal information includes at least one of individual identification information, a number of images not transferred yet, a number of images savable, a remaining battery level, communication environment information, error information, an internal temperature, angular information, and positional information.

3. The radiation imaging apparatus according to claim 1, wherein the internal information includes a remaining battery level.

4. The radiation imaging apparatus according to claim 1, wherein the radiation imaging apparatus transmits the internal information to the control apparatus at predetermined time intervals.

5. The radiation imaging apparatus according to claim 1, wherein the radiation imaging apparatus transmits the internal information to the control apparatus in a case where the radiation imaging apparatus is in a predetermined state.

6. The radiation imaging apparatus according to claim 5, wherein the predetermined state is a state in which acceleration equal to or greater than a predetermined value is applied to the radiation imaging apparatus.

7. The radiation imaging apparatus according to claim 5, wherein the predetermined state is a state in which an internal temperature of the radiation imaging apparatus is equal to or greater than a predetermined value.

8. The radiation imaging apparatus according to claim 1, comprising:

a first control unit that controls the radiation imaging apparatus in the radiation imaging; and a second control unit that is different from the first control unit, wherein the standby state is a state in which the first control unit is not activated.

9. The radiation imaging apparatus according to claim 8, wherein, in the standby state, the second control unit activates the first control unit in response to reception of the activation signal by the radiation imaging apparatus.

10. The radiation imaging apparatus according to claim 9, wherein the second control unit determines, based on the internal information, whether to activate the first control unit in response to the reception of the activation signal.

11. The radiation imaging apparatus according to claim 1, wherein the activation signal includes imaging protocol information, and wherein the radiation imaging apparatus determines a sequence for transitioning the radiation imaging apparatus to a state in which the radiation imaging is possible based on the imaging protocol information.

12. The radiation imaging apparatus according to claim 11, wherein the imaging protocol information indicates at least one of an imaging mode, an imaging technique, a tube voltage and a tube current of radiation emitted from a radiation source, and an irradiation time.

13. A radiation imaging system, comprising:

the radiation imaging apparatus according to claim 1; and the control apparatus.

14. A radiation imaging method, comprising:

transmitting, in a case where a radiation imaging apparatus that performs radiation imaging by detecting radiation emitted from a radiation source is in a standby state in which the radiation imaging apparatus awaits an activation signal transmitted from a control apparatus that is placed outside the radiation imaging apparatus and that controls the radiation imaging apparatus, internal information about the radiation imaging apparatus to the control apparatus; and displaying, by the control apparatus, the internal information about the radiation imaging apparatus on a display device in a case where the internal information about the radiation imaging apparatus is received, wherein a wireless communication method used to transmit the internal information about the radiation imaging apparatus to the control apparatus is a shorter-range wireless communication method than a wireless communication method used to transmit image data captured by the radiation imaging of the radiation imaging apparatus.

15. A non transitory computer-readable storage medium storing a program for causing a computer to execute the method according to claim 14.

* * * * *